(12) United States Patent
Keller et al.

(10) Patent No.: US 7,794,150 B2
(45) Date of Patent: Sep. 14, 2010

(54) LINEAR MODULE

(75) Inventors: Bernhard Keller, Wasserlosen (DE); Steffen Pfister, Niederwerrn (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 12/013,783

(22) Filed: Jan. 14, 2008

(65) Prior Publication Data

US 2008/0193065 A1 Aug. 14, 2008

(30) Foreign Application Priority Data

Feb. 8, 2007 (DE) .................. 10 2007 006 248

(51) Int. Cl.
*F16C 29/06* (2006.01)
(52) U.S. Cl. .............................. 384/45; 384/15; 384/43
(58) Field of Classification Search .................. 384/13, 384/15, 43–45, 49; 74/89.22, 89.32
See application file for complete search history.

(56) References Cited

U.S. PATENT DOCUMENTS

| | | | |
|---|---|---|---|
| 3,704,919 A | 12/1972 | Titt | |
| 4,390,215 A | 6/1983 | Mottate | |
| 4,441,765 A | 4/1984 | Kasai et al. | |
| 4,478,462 A * | 10/1984 | Teramachi | 384/45 |
| 4,850,720 A * | 7/1989 | Osawa | 384/13 |
| 4,921,358 A * | 5/1990 | Kasuga et al. | 384/15 |
| 5,097,716 A | 3/1992 | Barbat et al. | |
| 5,195,391 A * | 3/1993 | Barbat et al. | 384/45 |
| 5,399,023 A * | 3/1995 | Winkelmann et al. | 384/13 |
| 5,501,527 A * | 3/1996 | Chang | 384/45 |
| 5,547,285 A * | 8/1996 | Hutzel et al. | 384/15 |
| 5,634,722 A * | 6/1997 | Yuasa et al. | 384/44 |
| 5,967,667 A * | 10/1999 | Yatsu | 384/13 |
| 6,190,046 B1 * | 2/2001 | Agari | 384/13 |
| 6,257,765 B1 * | 7/2001 | Tsukada et al. | 384/45 |
| 6,435,718 B1 * | 8/2002 | Weiss et al. | 384/13 |
| 6,948,851 B2 | 9/2005 | Rossteuscher et al. | |
| 7,441,956 B2 * | 10/2008 | Koeniger et al. | 384/45 |
| 2005/0235824 A1 * | 10/2005 | Sato et al. | 92/165 R |
| 2006/0023978 A1 * | 2/2006 | Haub | 384/13 |
| 2007/0237436 A1 * | 10/2007 | Chen et al. | 384/45 |
| 2009/0161996 A1 * | 6/2009 | Michioka et al. | 384/8 |

FOREIGN PATENT DOCUMENTS

| | | |
|---|---|---|
| DE | 1 961 468 | 6/1971 |
| DE | 31 53 330 | 4/1987 |

(Continued)

*Primary Examiner*—Marcus Charles
(74) *Attorney, Agent, or Firm*—Michael J. Striker

(57) ABSTRACT

A linear module has a rail with a longitudinal axis, a table part, and at least one linear guide device; the at least one linear guide device has a main part embodied so that it is integrally joined to the table part, two end caps, and at least one endless roller element circuit. The length of the table part measured in the direction of the longitudinal axis is greater than that of the linear guide device and at least one end cap is accommodated in a recess of the table part; the recess is open toward the underside of the table part and is delimited by the top surface of the table part, by at least one side wall of the table part, and by the main part of the linear guide device.

12 Claims, 7 Drawing Sheets

FOREIGN PATENT DOCUMENTS

| | | |
|---|---|---|
| DE | 199 23 719 | 9/2000 |
| DE | 103 03 948 | 8/2004 |
| DE | 10 2004 03652 | 3/2006 |
| EP | 0 367 196 | 5/1990 |
| WO | WO 9956026 A2 * | 11/1999 |

* cited by examiner

LINEAR MODULE

CROSS-REFERENCE TO A RELATED APPLICATION

The invention described and claimed hereinbelow is also described in German Patent Application DE 10 2007 006 248.8 filed on Feb. 8, 2007. This German Patent Application, whose subject matter is incorporated here by reference, provides the basis for a claim of priority of invention under 35 U.S.C. 119(a)-(d).

BACKGROUND OF THE INVENTION

Field of Invention

The invention relates to a linear module including a rail with a longitudinal axis, a table part, and at least one linear guide device by means of which the table part is movably guided on the rail along its longitudinal axis; the at least one linear guide device has a main part embodied as integrally joined to the table part, two end caps, and at least one endless roller element circuit; the roller element circuit has a load-bearing roller element channel section, a return channel section that is at least partly accommodated in the main part, and two deflecting channel sections that are accommodated in the end caps and connect the load-bearing roller element section and the return channel section to each other.

A linear module of this kind is known, for example, from EP 0 367 196 A1. In the known linear module, the table part has the same length as the linear guide device in the direction of the longitudinal axis of the rail so that the two end caps of the linear guide device can be easily mounted from the end surfaces of the table part. There are, however, specific applications in which the length of the table part must be greater than that of the linear guide device. If in this case, too, the table part were to be embodied so that the two end caps could be mounted from the end surfaces of the table part, then this would result in a reduction in the rigidity of the table part.

SUMMARY OF THE INVENTION

The object of the present invention, therefore, is to modify a linear module of the type mentioned at the beginning to permit the table part to be embodied with sufficient rigidity, even when the length of the table part measured in the direction of the longitudinal axis is greater than that of the linear guide device. The problem of the stability and rigidity of the table part comes into play particularly when accompanied by a simultaneous requirement to embody the table part with the lowest possible profile.

This object is attained according to the invention by means of a linear module of the type mentioned at the beginning in which the length of the table part measured in the direction of the longitudinal axis is greater than that of the linear guide device and in which at least one end cap is accommodated in a recess of the table part; the recess is open toward the underside of the table part and is delimited by the top surface of the table part, by at least one side wall of the table part, and by the main part of the linear guide device. The at least one side wall of the table part in this instance extends essentially orthogonal to the top surface of the table part, but essentially parallel to the longitudinal axis of the rail. In this way, the side wall of the recess contributes not only to the stability of the table part, but also improves the visual appearance of the table part and therefore of the entire linear module.

According to the invention, one of the two end caps can in fact be mounted from an end surface of the table part. For the other end cap, however, a recess is let into the table part from the underside of the table part and this other end cap can be inserted into this recess from the underside of the table part. The provision of the recess, whose size is adapted to that of the end cap, allows for the least possible weakening of the table part. It is naturally also conceivable in principal for both end caps to be situated in corresponding recesses.

In principal, it is even possible according to the invention to mount two or more guides in series on a table part. In this case, too, it is necessary to accommodate at least two of the end caps inside the table part without weakening its stability and rigidity, which can be assured by means of the embodiment according to the invention. This embodiment is suitable, for example, for linear modules that are subjected to powerful loads. In these modules, it can also be useful to provide at least two parallel guides next to each other.

In order to be able to keep the weakening of the table part to a minimum, according to a modification of the invention, the width of an accommodating space—which is provided for the rail in the table part, on the side of the recess farther away from the main part of the linear guide device—measured in a direction extending essentially orthogonal to the longitudinal direction and essentially parallel to the top surface of the table part, is less than the width of the recess, preferably with the table part extending laterally, essentially all the way to the rail. The table part in this case, only needs to maintain a minimum spacing that is determined by the tolerances, taking into account possible relative movements between the table part and the rail. This measure permits a relatively solid and therefore stable embodiment of the table part.

The gain in stability and rigidity of the table part in this case, however, comes at the expense of the machinability of the boundary walls of the recess, particularly the boundary wall associated with the main part of the linear guide device. But the latter boundary wall in particular is usually provided with threaded bores that are used for fastening the end cap to the main part of the linear guide device.

According to the invention, therefore, there is the additional problem of fastening the end cap, which is accommodated in the recess, to the table part.

An end cap especially embodied for this particular use could conceivably be provided. End caps, however, are injection-molded components of complex design so that the production of a separate injection mold would be accompanied by very high costs. According to the invention, therefore, between the end cap and the main part, an adapter is provided, which is likewise accommodated in the recess. This adapter is in fact an additional element, which must be produced, for example, as an injection molded part. As will be demonstrated in the description below, however, this adapter is of a significantly simpler design than the end cap and is therefore less expensive to manufacture than an especially embodied end cap. For a description of the design of end caps, see DE 10 2004 036 529 A1.

This adapter can, for example, be fastened to the table part from its top side, for example by means of threaded bolts that can be introduced into threaded bores of the adapter through the bores in the top side of the table part.

According to another embodiment of the invention, the adapter is provided with threaded bores for the fastening of the end cap. Consequently, the mounting of the end cap in the recess can proceed so that first, the end cap is fastened to the adapter and then this preassembled structural unit is inserted into the recess from the underside of the table part and then attached to the table part from the top side of the table part.

According to a modification of the invention, the adapter is provided with passages through which a section of a return channel of the at least one roller element circuit extends; the passages are preferably equipped with centering sinks for the return channel of an end cap. As a result, compared with a conventional linear guide device, the adapter constitutes a practical extension of the main part of the linear guide device.

In order to have sufficient room in the table part to accommodate the heads of threaded bolts or similar fastening elements for fastening the adapter to the table part, the adapter can be provided with a recess and the table part can have a bridge piece that is embodied to fit this recess. In addition, this bridge piece can contribute to the stability and rigidity of the table part.

In a modification of the invention, the adapter can be embodied with a lubrication bore for conveying lubricant between the end cap and the main part. For example, it is possible to convey lubricant from a lubricant supply point to an end surface of the table, through the end cap situated there, a corresponding conduit in the main part of the linear guide device, and the lubricant bore of the adapter to the end cap situated in the recess in order to be able to provide a sufficient lubrication of the roller elements in the region of this end cap as well.

It is also advantageous if steel inserts, which are attached to the main part and delimit the load-bearing roller element channel section on the side of the table part, span the adapter in a self-supporting way. These self-supporting steel inserts can therefore be supported solely on the table part and not on the adapter. This is advantageous for the reasons explained in DE 103 03 948 A1.

The length of the table part can be at least 50% greater than the length of the at least one linear guide device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 6 and 7 show two perspective views of the adapter from different directions, with the direction in FIG. 6 corresponding to that of FIG. 5, while FIG. 7 shows the opposite direction.

DESCRIPTION OF THE PREFERRED EMBODIMENTS

Figure 1:
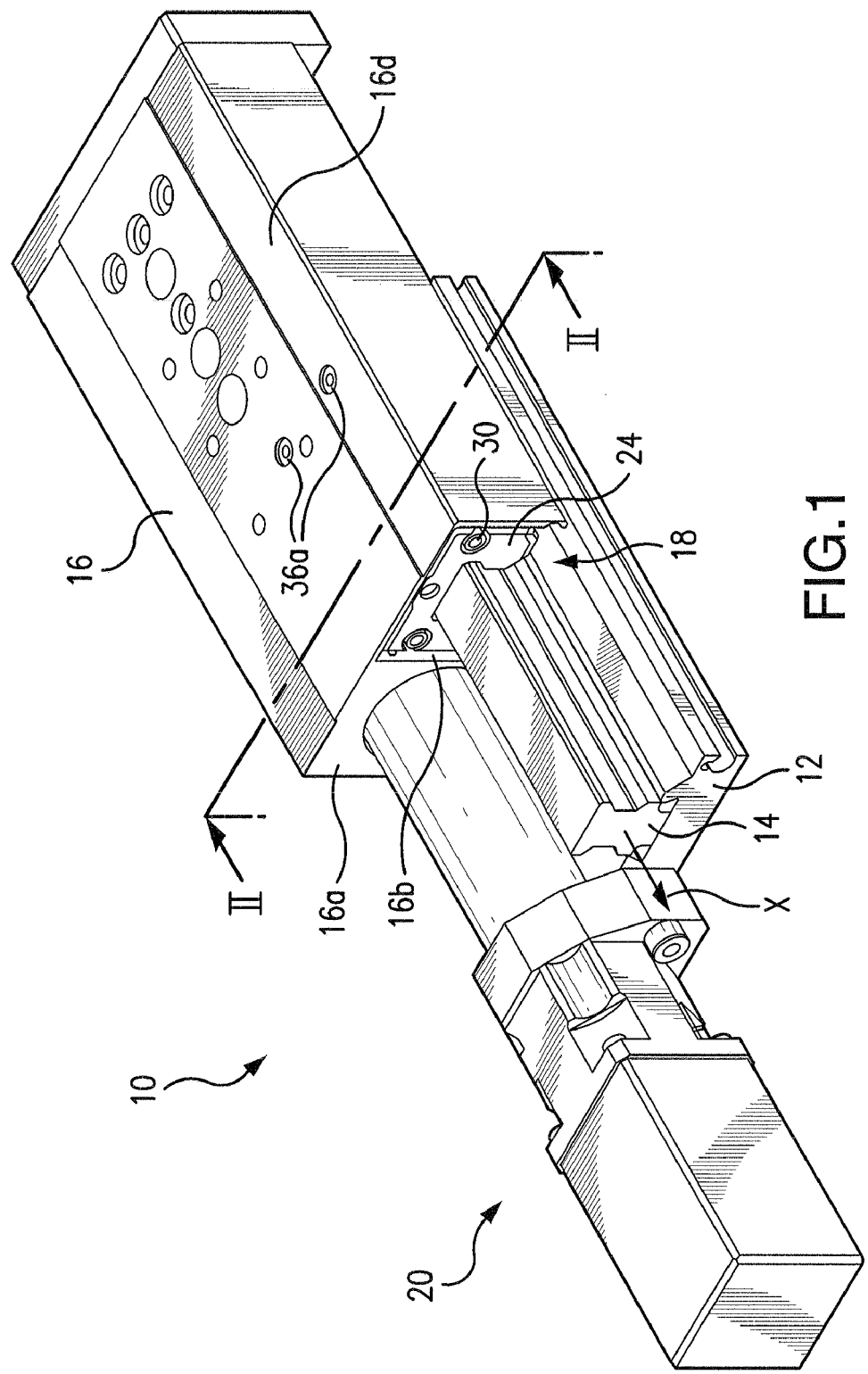
FIG. 1 is a perspective general view of a linear module according to the invention.
Figure 2:
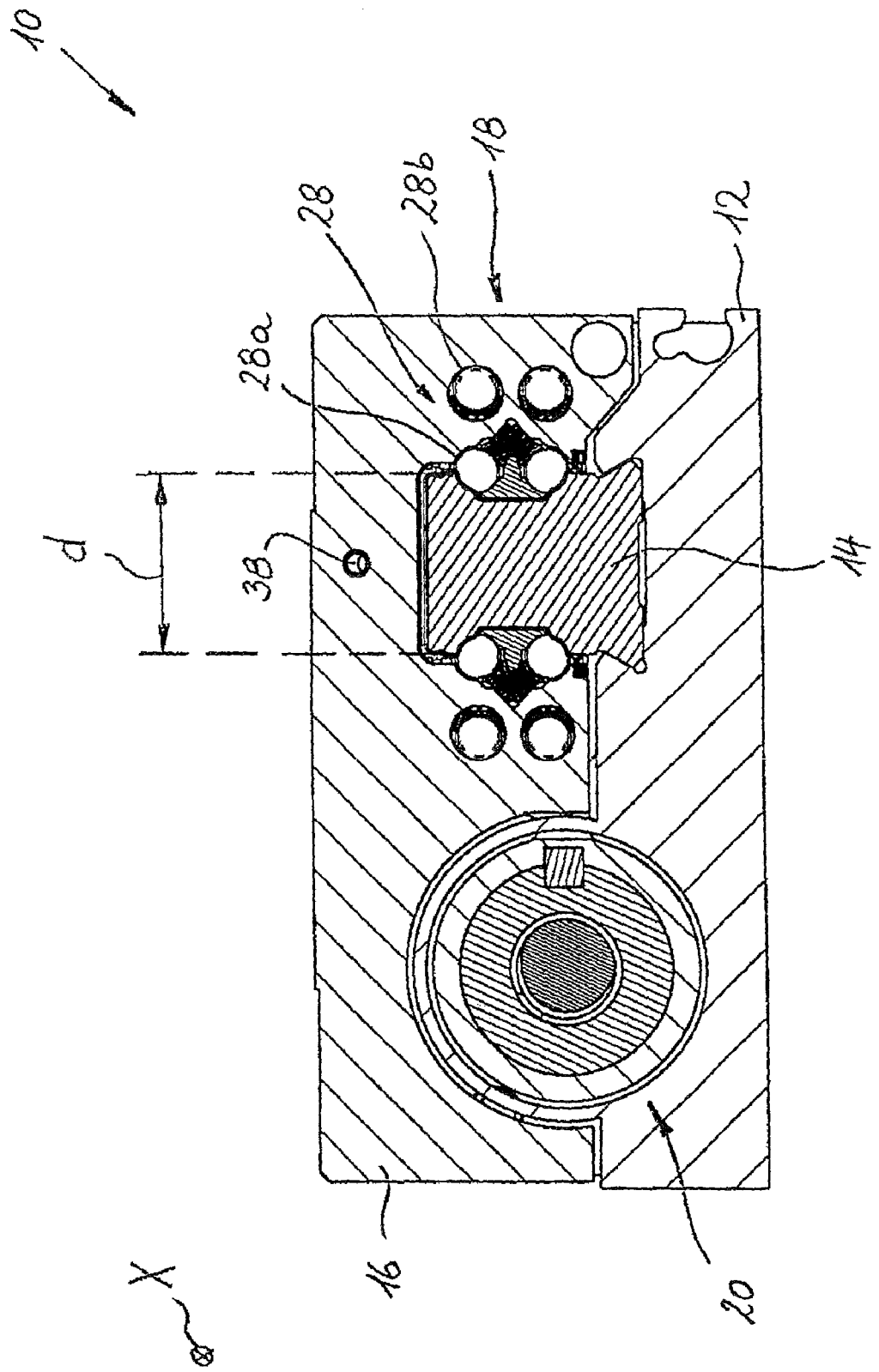
FIG. 2 shows a cross section through the linear module from FIG. 1, extending in the plane labeled II-II in FIG. 1.

In FIGS. 1 and 2, the linear module according to the invention is labeled as a whole with the reference numeral 10. It includes a rail 14 mounted on a baseplate 12, extending in a longitudinal direction X. It also includes a table part 16, that a linear guide device 18 guides on the rail 14 in a movable fashion in its longitudinal direction X. The table part 16 is driven in relation to the rail 14 by a spindle drive 20, whose design is intrinsically known and therefore does not need to be explained in greater detail here.

As is known, the linear guide device 18 contains a main part 22 (also see FIGS. 3 and 4), which is embodied as integral to the table part 16, and two end caps 24 (also see FIG. 4) and 26 (see FIG. 5), which are attached to the end surfaces of the main part 22 extending essentially orthogonal to the longitudinal direction X. In the exemplary embodiment shown, the linear guide device 18 has a total of four roller element circuits 28, each with a load-bearing channel section 28a, a return channel section 28b, and two deflecting channel sections, not shown, for connecting the load-bearing channel section 28a to the return channel section 28b; these deflecting channel sections are accommodated in the end caps 24 and 26. The end cap 24 is fastened to the main part 22 in an intrinsically known fashion, in fact it is inserted from the end surface 16a of the table part 16 into an accommodating recess 16b provided for it and is fastened to the main part 22 by means of two threaded bolts 30 extending in the longitudinal direction X.

Figure 3:
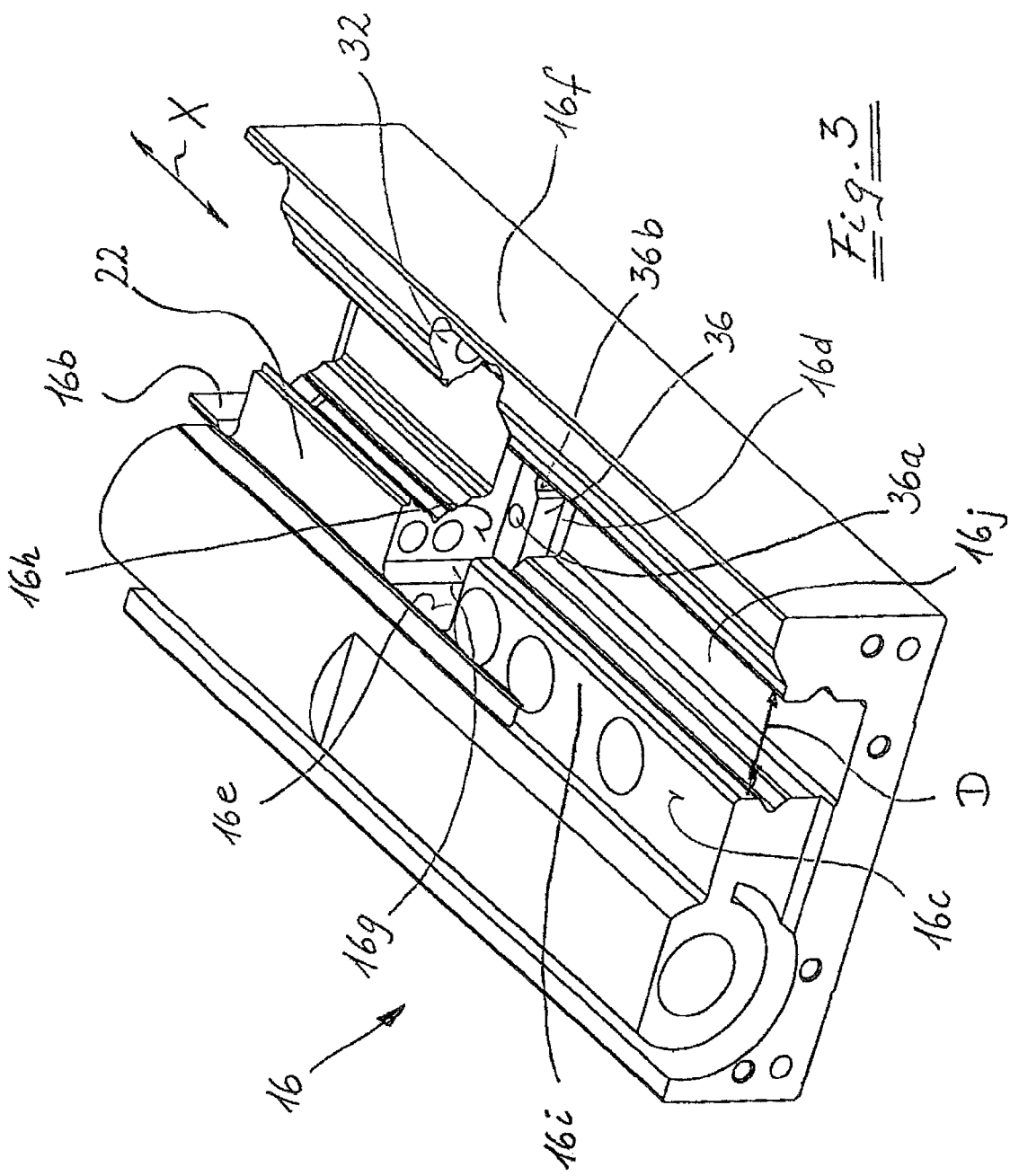
FIGS. 3 and 4 are perspective bottom views of the table part of the linear module according to the invention, with FIG. 3 showing the table part alone and FIG. 4 showing the table part in a partially assembled state.
Figure 4:
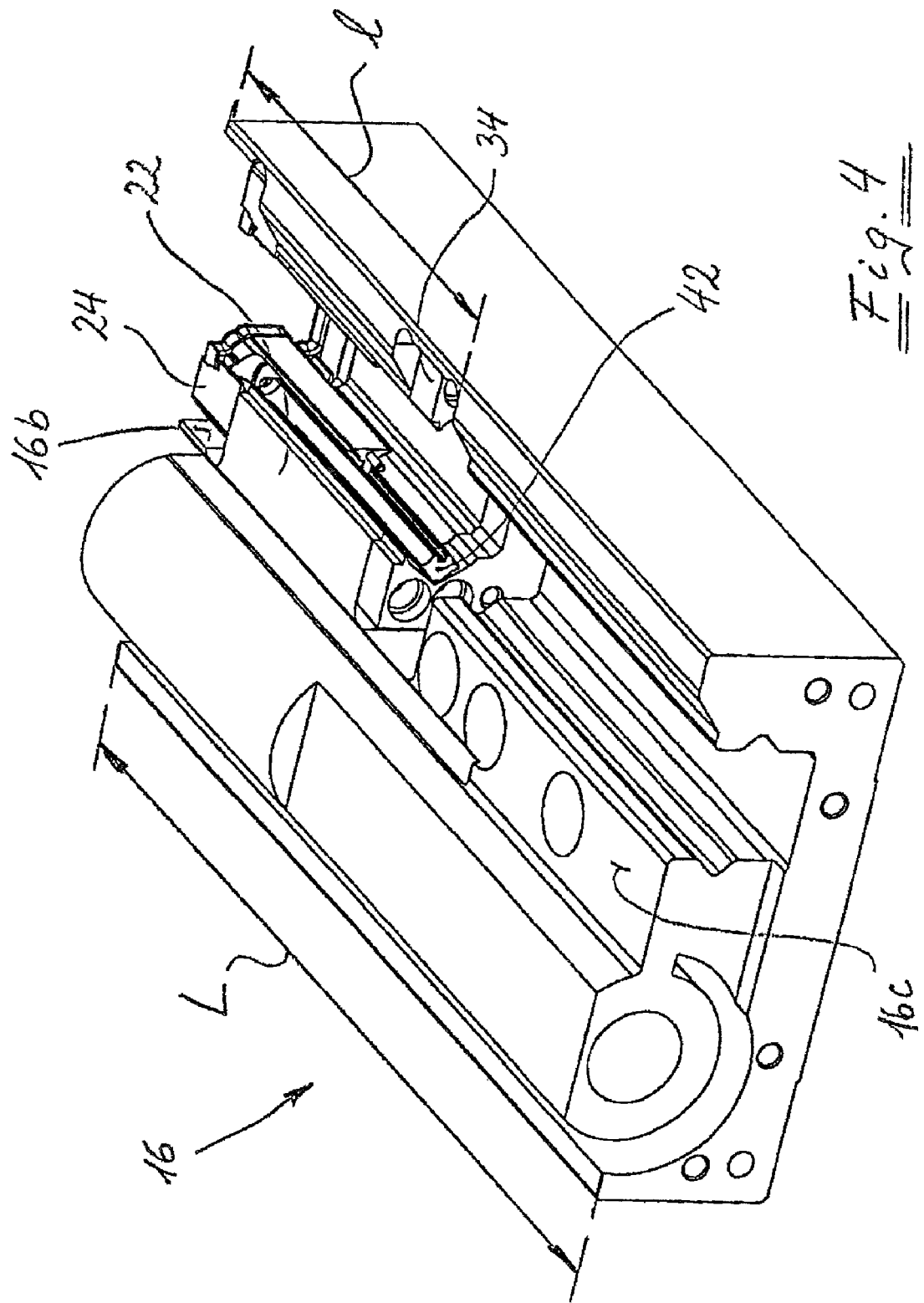

As depicted particularly in FIGS. 3 and 4, a recess 32 is embodied to accommodate the second end cap 26 in the table part 16 from its underside 16c. This recess 32 is delimited by the upper boundary wall 16d of the table part 16, by two lateral boundary walls 16e and 16f that extend essentially orthogonal to the boundary wall 16d and essentially parallel to the longitudinal axis L of the rail 14, and by two end walls 16g and 16h of the table part 16 that extend essentially orthogonal to the longitudinal axis L, one of which 16h is part of the main part 22 of the linear guide device 18. The recess 32 is dimensioned so that it accommodates not only the end cap 26 but also an adapter 34 that serves to fasten the end cap 26 to the table part 16 and consequently to the main part 22 of the longitudinal guide device 18.

Figure 5:
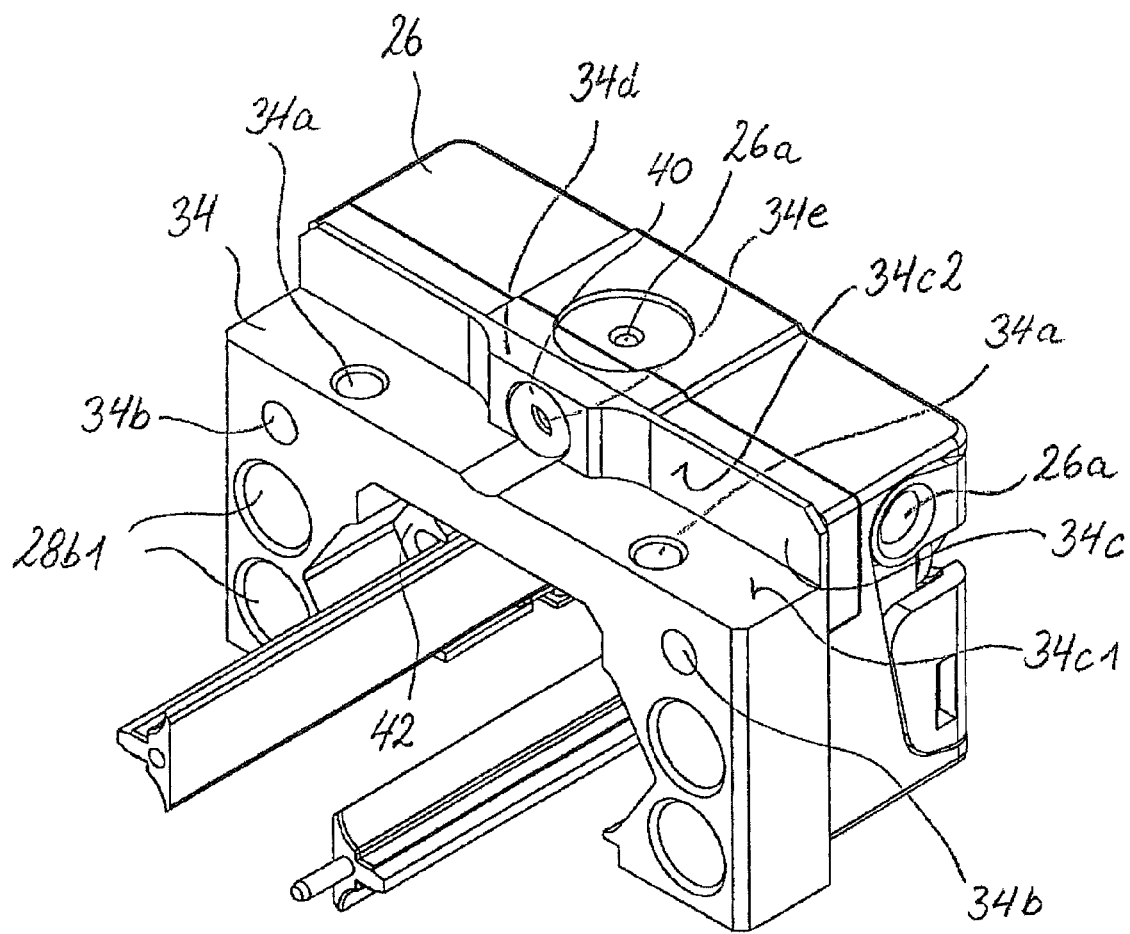
FIG. 5 is a perspective view of an end cap preassembled with an adapter.
Figure 6:
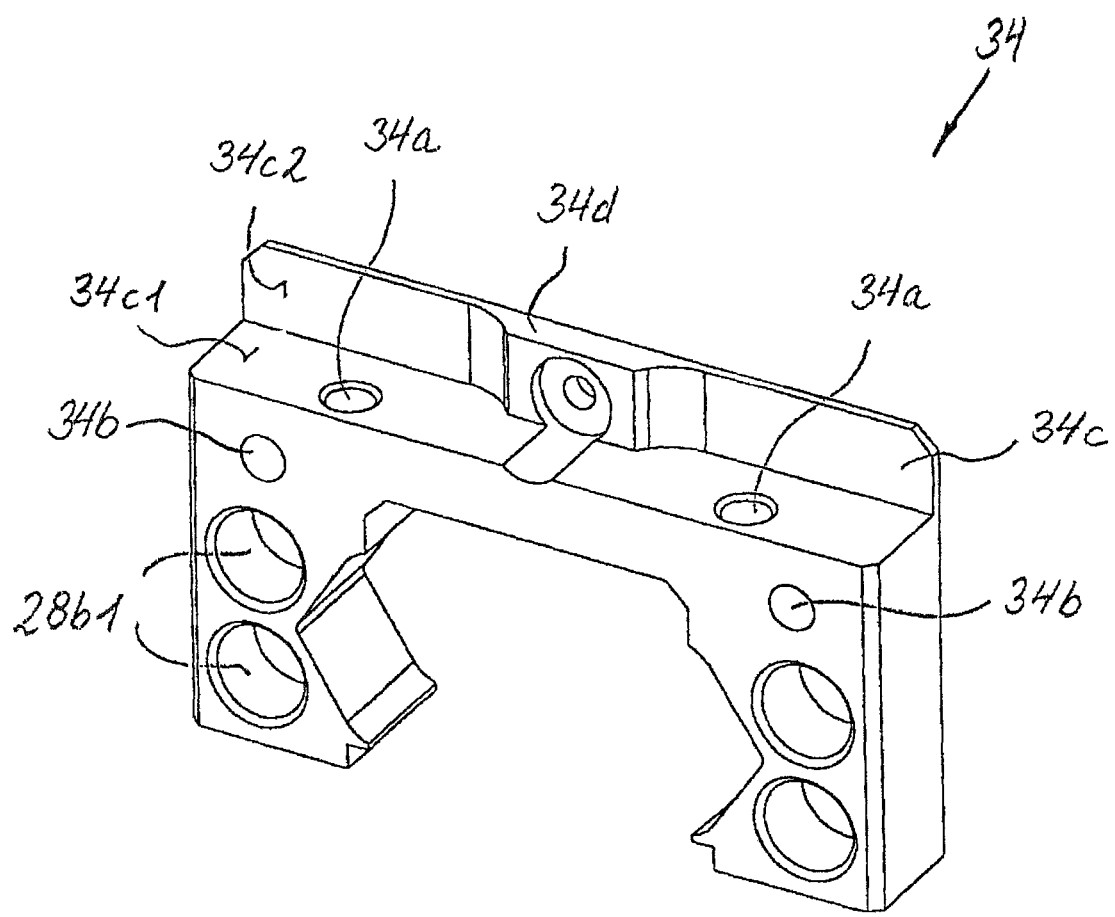

At the base of the recess 32, i.e. at the transition from the bottom of the upper boundary wall 16d to the end surface 16h, a bridge piece 36 is integrally formed onto the table part 16. This bridge piece 36 is used for the attachment of the adapter 34 to the table part 16. To this end, the bridge piece 36 is provided with two through openings 36a extending through it, into which two fastening screws 38 (see FIGS. 1 and 2) are inserted from the upper boundary wall 16d of the table part 16 and engage in threaded bores 34a of the adapter 34 (see FIG. 5). FIG. 5 also shows two threaded bores 34b that are used for the attachment of the end cap 26 to the adapter 34, in fact by means of threaded bolts that are identical to the threaded bolts 30, but are not visible from the direction shown in FIG. 5.

In order to mount the end cap 26 onto the linear guide device 18, the end cap 26 is first screwed to the end cap 34 by means of the above-mentioned threaded bolts and threaded bores 34b. Then the resulting subassembly shown in FIG. 5 is inserted head first—i.e. in an orientation that is reversed in comparison to the orientation shown in FIG. 5—into the recess 32 of the table part 16 in the orientation shown in FIG. 3, with the adapter 34 situated between the end cap 26 and the main part 22 of the linear guide device 18.

It is also clear from FIG. 5 that the adapter 34 has a notch 34c that is embodied to fit the bridge piece 36 and in whose one boundary surface 34c1, the threaded bores 34a are situated, aligned with the through openings 36a of the bridge piece 36. The other boundary surface 34c2 of the notch 34c has a protrusion 34d through which a through hole 34e passes. The bridge piece 36 has an indentation 36b that corresponds to this protrusion 34d and that adjoins a lubricant supply conduit, which is embodied in the main part 22 of the linear guide device 18 (also see FIG. 2). As is clear from FIG. 5, the through hole 34e is encompassed by an O-ring seal 40. Consequently, the end cap 26 can also be supplied with lubricant, even though all of its lubricant supply points 26a are covered by the table part 16 when the end cap is in the installed state in the recess 32. To this end, lubricant introduced into the end cap 24 via the lubricant conduit and the through hole 34e which forms its extension is conveyed to the end cap 26 and is fed internally therein to the deflection channel sections, not shown, where it is applied to the roller elements.

Figure 7:
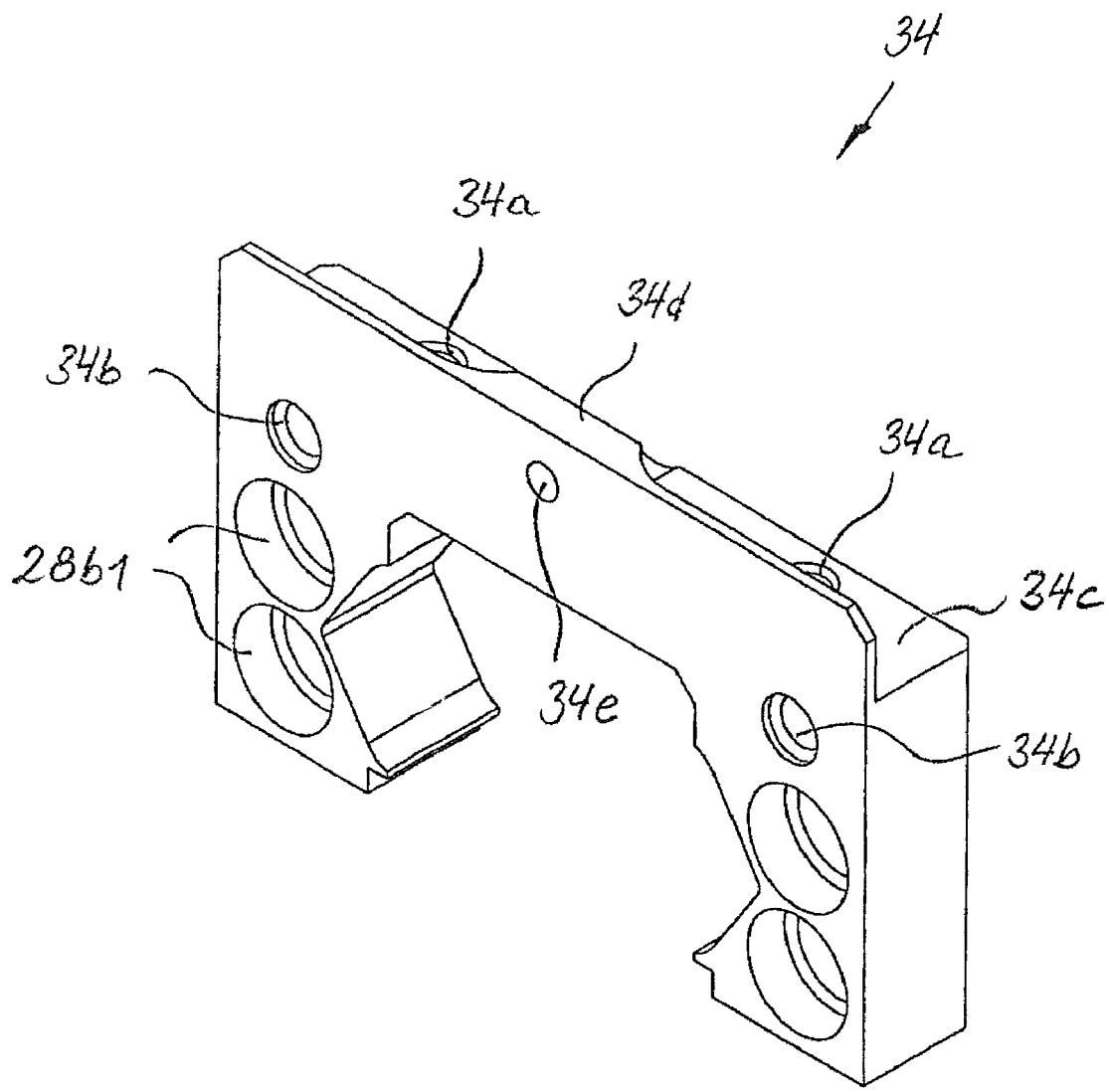

If the linear guide device 18 according to the invention is compared to a conventional linear guide device, then the adapter 34 must be considered as part of the main part 22 of the linear guide device 18. Correspondingly, for each roller element circuit 28, the adapter 34 also includes a section 28b1 of the return channel section 28b (see FIGS. 2 and 5). As is particularly clear in FIG. 7, these through holes 28b1 are provided with centering sinks for connecting the deflection channel sections in the end cap 26 to the return channel sections 28b.

As shown in FIGS. 2 and 4, the linear guide device 18 has steel inserts 42, as is intrinsically known from EP 0 367 196 A1, which are fastened to the main part 22 of the linear guide device. The adapter 34 is embodied according to the invention so that these steel inserts 42 span the adapter 34 in a self-supporting fashion. These steel inserts 42 are therefore supported solely on the table part 16 and on the main part 22 of the linear guide device 18, but not on the adapter 34. The technical reasons for this are given in DE 103 03 948 A1.

It should also be noted that even in a section 16i that adjoins the side of the recess 32 farther away from the main part 22 of the linear guide device 18, the table part 16 is embodied so that extends at least essentially to the rail 14. In particular, the width D (see FIG. 3) of an accommodating space 16j for the rail 4 is slightly greater than the width d of the rail (see FIG. 2). The difference (D–d) is dimensioned so that it takes into account tolerances in the relative movements between the table part 16 and rail 14 in the course of the movement of the table part 16 in relation to the rail 14.

As can be inferred from the above description, the length L of the table part 16 (see FIG. 4) measured in the direction of the longitudinal axis X is significantly greater than the length l of the linear guide device 18, which length l is made up not only of the main part 22, but also of the adapter 34 and the two end caps 24 and 26. This is particularly advantageous if the table part 16 is to be telescopically extendable beyond the end of the baseplate 12, as shown in FIG. 1.

It will be understood that each of the elements described above, or two or more together, may also find a useful application in other types of constructions differing from the type described above.

While the invention has been illustrated and described as embodied in a linear module, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A linear module, comprising a rail having a longitudinal axis; a table part; at least one linear guide device that guides said table part on said rail, so that said table part is movable along said longitudinal axis of said rail, said at least one linear guide device having a main part configured so that it is integrally joined to said table part, two end caps, and at least one endless roller element circuit, said roller element circuit having a load-bearing roller element channel section, a return channel section that is at least partly accommodated in said main part, and two deflecting channel sections which are accommodated in said end caps and connect said load-bearing roller element section and said return channel section to each other, wherein a length of said table part measured in a direction of said longitudinal axis is greater than a length of said linear guide device, and at least one of said end caps is accommodated in a recess of said table part, which recess is open toward an underside of said table part and is limited by a top surface of said table part, by at least one side wall of said table part, and by said main part of said linear guide device.

2. A linear module as defined in claim 1, wherein a width of an accommodating space which is provided for said rail in said table part on a side of said recess farther away from said main part, measured in a direction extending substantially orthogonal to said longitudinal direction and substantially parallel to said top surface of said table part, is less than a width of said recess.

3. A linear module as defined in claim 2, wherein said table part extends laterally, substantially all the way to said rail.

4. A linear module as defined in claim 1; and further comprising an adaptor provided between said one end cap and said main part and accommodated in said recess.

5. A linear module as defined in claim 4, wherein said adaptor is fastenable to said table part from said top surface of said table part.

6. A linear module as defined in claim 4, wherein said adaptor is provided with a notch and said table part has a bridge piece that is configured to fit said notch of said adaptor.

7. A linear module as defined in claim 4, wherein said adaptor is provided with threaded bores for attachment of said one end cap.

8. A linear module as defined in claim 4, wherein said adaptor is provided with passages through which a section of said return channel section of said at least one roller element circuit extends.

9. A linear module as defined in claim 8, wherein said passages are provided with centering sinks for said return channel section of said one end cap.

10. A linear module as defined in claim 4, wherein said adaptor is provided with a lubricant bore for conveying lubricant between said one end cap and said main part.

11. A linear module as defined in claim 4; and further comprising steel inserts mounted on said main part and bordering said load-bearing roller element channel section on a side of said table part so as to span said adaptor in a self-supporting way.

12. A linear module as defined in claim 1, wherein said table part has a length which is at least 50% greater than a length of said at least one linear guide device.

* * * * *